(12) United States Patent
Maiden

(10) Patent No.: US 8,197,771 B2
(45) Date of Patent: Jun. 12, 2012

(54) TWO BOTTLE FILTER CONNECTOR SYSTEM WITH REMOVEABLE RING

(75) Inventor: Miles Maiden, Blue Hill, ME (US)

(73) Assignee: Hydro-Photon, Inc., Blue Hill, ME (US)

(*) Notice: Subject to any disclaimer, the term of this patent is extended or adjusted under 35 U.S.C. 154(b) by 0 days.

(21) Appl. No.: 12/748,941

(22) Filed: Mar. 29, 2010

(65) Prior Publication Data

US 2010/0237017 A1 Sep. 23, 2010

Related U.S. Application Data

(63) Continuation-in-part of application No. 11/068,417, filed on Feb. 28, 2005, now Pat. No. 7,713,483.

(60) Provisional application No. 60/573,209, filed on May 21, 2004, provisional application No. 60/548,974, filed on Mar. 1, 2004.

(51) Int. Cl.
B01L 3/00 (2006.01)
(52) U.S. Cl. ....................................... 422/501
(58) Field of Classification Search .......... 422/101, 422/501
See application file for complete search history.

(56) References Cited

U.S. PATENT DOCUMENTS

| 2,167,225 | A |   | 11/1936 | Van Eweyk |
| 2,775,350 | A | * | 12/1956 | Jones ............................ 210/446 |
| 3,217,917 | A |   | 11/1965 | George |
| 3,788,483 | A | * | 1/1974 | Conway ....................... 210/416.1 |
| 4,512,880 | A | * | 4/1985 | Connolly ....................... 209/250 |
| 6,110,424 | A | * | 8/2000 | Maiden et al. .................. 422/24 |
| 6,478,956 | B2 |   | 11/2002 | Kaura |
| 6,910,720 | B2 |   | 6/2005 | Shimei et al. |

* cited by examiner

Primary Examiner — Bobby Ramdhanie
(74) Attorney, Agent, or Firm — Cesari and McKenna, LLP; Patricia A. Sheehan

(57) ABSTRACT

A portable water filtration system that interconnects two, otherwise separate, water bottles arranged vertically such that water flows under gravitational pressure from a first water bottle through a filter configured to capture small particle impurities to a second water bottle and removes small particle impurities before they enter the second water bottle. The filtration system is implemented within a cap that can attach to a variety of standard water bottles, such as NALGENE™ water bottles. A removable connector ring attaches to the cap to connect a second water bottle to the system. When vertically aligned, water flows from a first water bottle through the filter element in the cap to the second water bottle to remove small and large particles.

13 Claims, 14 Drawing Sheets

TWO BOTTLE FILTER CONNECTOR SYSTEM WITH REMOVEABLE RING

CROSS-REFERENCE TO RELATED APPLICATIONS

The present application is a continuation-in-part of commonly assigned U.S. patent application Ser. No. 11/068,417, entitled Portable Filter Cap, which was filed on Feb. 28, 2005, now U.S. Pat. No. 7,713,483, by Miles Maiden and is hereby incorporated by reference as though fully set forth herein.

The present application claims the benefit of U.S. Provisional Patent Application Ser. No. 60/548,974, entitled Portable Filter Cap, which was filed on Mar. 1, 2004, to by Miles Maiden and is hereby incorporated by reference as though fully set forth herein.

The present application also claims the benefit of U.S. Provisional Patent Application Ser. No. 60/573,209, entitled Portable Filter Cap, which was filed on May 21, 2004, by Miles Maiden and is hereby incorporated by reference as though fully set forth herein.

FIELD OF THE INVENTION

This invention relates generally to water filtration systems, and, more specifically, to a two container filtration system.

BACKGROUND OF THE INVENTION

Often, it is unsafe to consume water acquired from a naturally occurring fresh wan ter source, such as a stream, lake or river. In some areas, fresh water also may be tainted by the local plumbing or water treatment facilities. In particular, the water may contain various inorganic or biological contaminants that may be hazardous to those who drink it. For example, the water may contain harmful heavy metals, minerals and soil sediment as well as bacteria, viruses, algae and so forth. It is therefore important for hikers, campers, travelers, etc. to remove these impurities from water obtained from untrusted sources.

Drinking water is typically collected from a water source and stored in a conventional storage container, such as a canteen or standard Nalgene™-type bottle. Portable water purification systems are currently available for purifying water within these storage containers. Such purification systems usually employ filtration systems and/or chemical or irradiative treatments to eliminate contaminants. For instance, the water may be disinfected by chlorine, hydrogen peroxide, iodine or ultra-violet (UV) radiation applied within the bottle or canteen. In addition, as the water is extracted from the bottle or canteen, the water may be passed through a mesh filter to remove larger particulates, such as heavy metals and the like.

The previous purification techniques decontaminate water stored within the water storage container, however, they do not prevent contamination of the outside of the container during the water-filling process. More specifically, people often drink directly from an opening, e.g., at the end of a protruding "neck" or inlet on the storage container, and are therefore susceptible to any contaminants that have adhered to the outside surface of the opening. As a result, the health of a hiker, camper, traveler, etc. may be put at risk by untreated water on the outside of the storage container even after the water stored inside the container has been decontaminated by conventional techniques.

The prior storage container water purification systems that employ filtration systems further suffer the disadvantage that "dirty" water is stored directly in the water storage container, with the filtering occurring as the water is extracted. Consequently, the inside of the container may have to be periodically cleaned to remove any waste build up that has collected therein.

Water bottle filtration systems typically operate relatively quickly to filter out the larger particles through meshes that are sized to capture the larger particles. However, the filtered water in the quick filtrations systems may appear murky/dirty because small particles still remain in the water.

Other systems may utilize a smaller mesh to trap smaller particles resulting in clearer water. However, these systems require a user to hold the water bottle under the water for a very long time as the water slowly filters through the filter into the water bottle.

SUMMARY OF THE INVENTION

The invention is a portable water filtration system that interconnects two water bottles such that unfiltered water flows from the first water bottle through a filter with a fine mesh and into a second water bottle without tending to the two water bottles. The to water drains slowly from the first water bottle to the second water bottle in a water-tight environment. Furthermore, gravitational pressure from the water in the first water bottle allows the water to flow easily and steadily through the filter element without the use of a pump.

The filtration system filter element resides in a cap that can attach to a variety of standard water bottles, such as Nalgene™-type water bottles. The cap connects to an inlet of the second water bottle and seals around the second container's inlet, to prevent the outer surface of the second container inlet from contacting the water. Preferably, the cap threadingly engages with the outer surface of the inlet. Once the cap is fitted over the inlet, a filter integrated with the cap, either as a removable insert or as an integral part thereof, filters water that flows through the inlet and into the body of the water bottle. The water flows to the filter element from the first water bottle, which is held in place by a removable connector ring that threadingly engages both an inlet of the first water bottle, and the cap that is, in turn, attached to the second water bottle. Specifically, a user holds the second water bottle vertically on top of the first water bottle when screwing the removable connector ring onto the cap. Then, the user flips the two bottle connector system over, to arrange the first water bottle vertically on top of the second water bottle. This arrangement allows the water to flow from the first water bottle to the second water bottle through the filter under gravitational pressure and, as the water flows, the filter traps small particles, without requiring the user to tend to the two bottles. For example, the system can filter water while in a user's backpack, wedged in an upright position. Advantageously, the portable water filtration system is compact and may be easily trans-ported while attached to the water bottle, or, alternatively, may be transported as a separate unit. In addition, the filtration system is compatible with conventional UV and chemical water treatments for removing biological contaminants. The filtration system may be employed for various recreational, commercial or military uses.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1A:
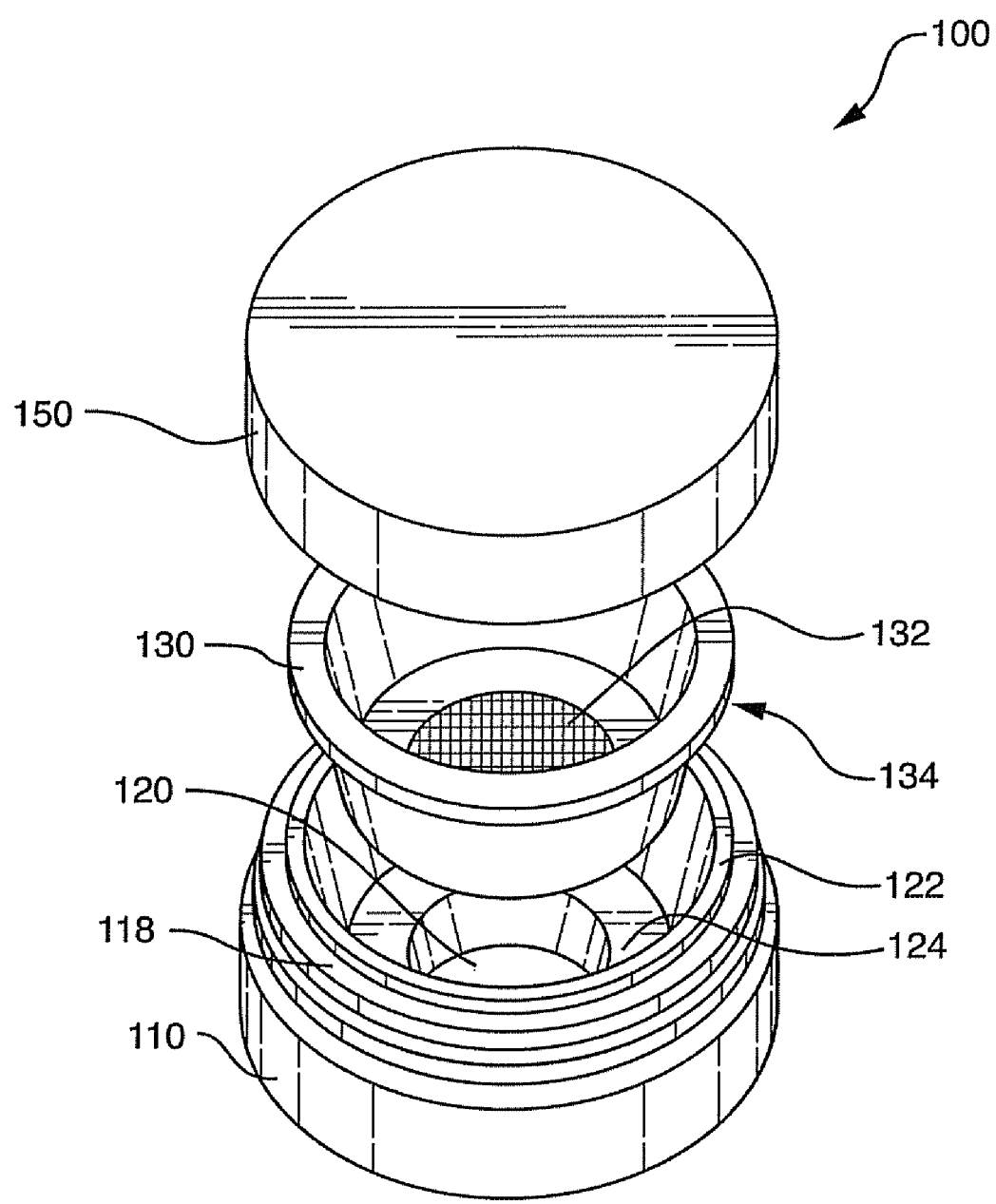
FIG. 1A is an oblique top view of a base, filter and cover that collectively may be used to assemble the cap of the present invention in accordance with an illustrative embodiment.

FIG. 1A illustrates an exemplary portable cap 100 that is adapted to attach to a variety of conventional water storage containers, such as Nalgene™-type water bottles. The cap 100 includes an integrated water filtering system, which is illustratively embodied as a filter 130 that interfaces with a base 110. The base 110 also receives a conventional bottle cover 150, as discussed in more detail below with reference to FIG. 1C. The cap's base and filter components are preferably constructed as single pieces of molded plastic. The base 110 is adapted to attach to a standard inlet (not shown) through which water enters or leaves the water storage container, with center hole 120 positioned to allow water to flow into and out of the storage container through the inlet. Preferably, the base 110 is threadingly attached to the inlet.

Figure 1B:
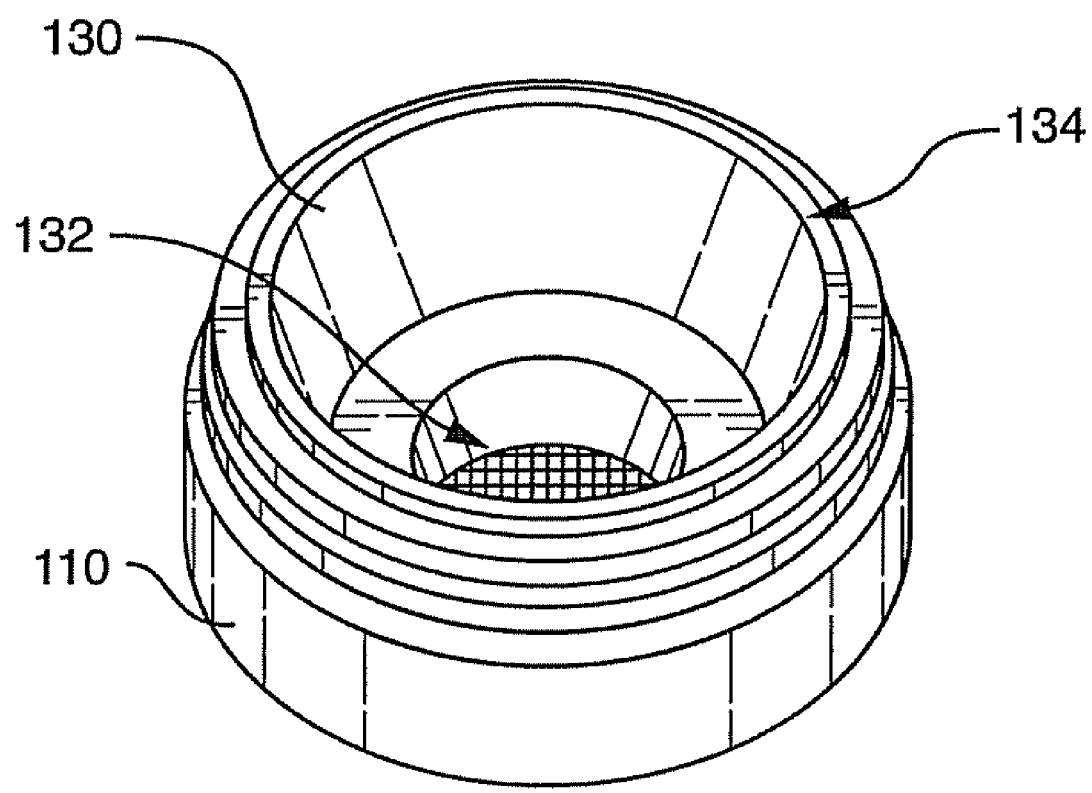
FIG. 1B is an oblique top view of the illustrative base and filter that may be used to assemble the cap of FIG. 1A.

The filter 130 is constructed to fit within the base 110. Illustratively, a rim 134 around the circumference of the filter rests upon the top surface 122 of the base 110. For additional support, the filter 130 also may be seated on a ridge 124 molded into the base 110. As shown, the weight of the filter secures it within the base. However, it is also contemplated that securing means, such as clamps or adhesives, may be used to secure the filter within the base. Moreover, in an alternative embodiment, the filter 130 is not a separate component of the cap 100, and instead is directly incorporated (e.g., molded) into the base 110. FIG. 1B illustrates the filter 130 seated within the base 110.

When properly positioned within the base 110, a mesh 132 in the filter 130 is to aligned with the hole 120. The mesh contains holes that are sized to block relatively large particulates, such as heavy metals, dirt, etc., as water passes through the filter 130 and into the storage container. The mesh size may, however, permit relatively small bacteria, viruses and the like to pass through. The mesh may be constructed from various materials, such as plastic or metal strands, and may be molded, embedded or otherwise secured within the bottom surface of the filter 130 by conventional means known in the art.

Figure 1C:
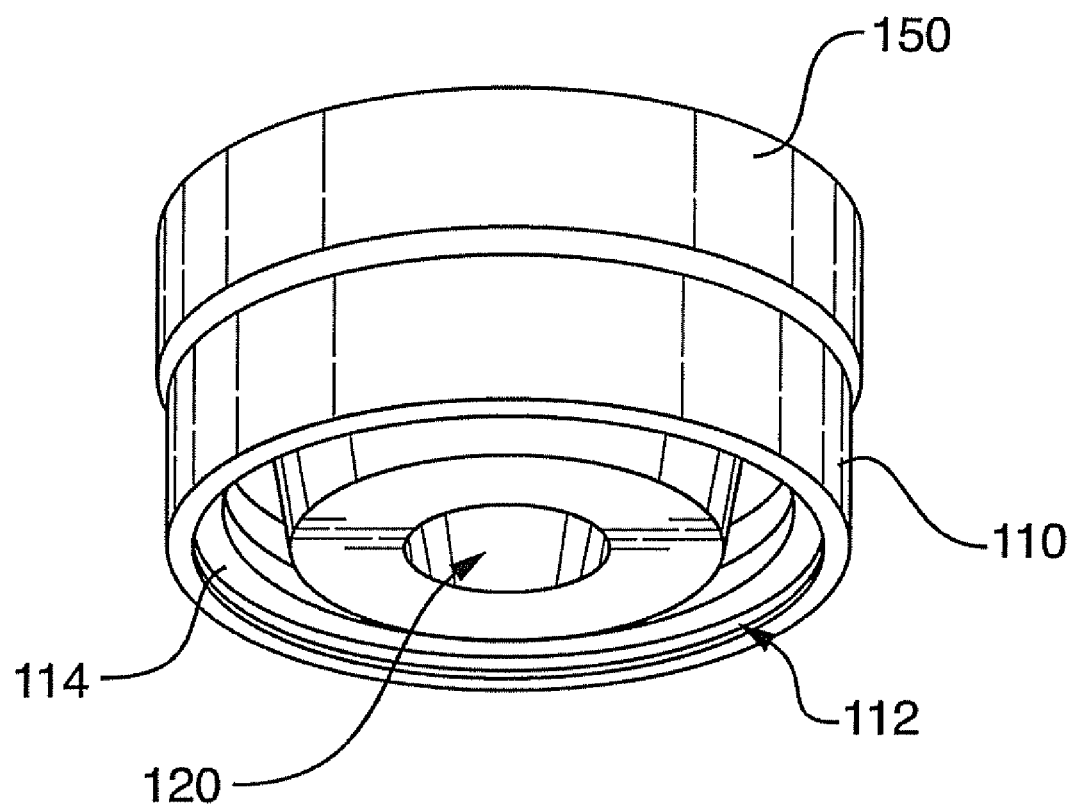
FIG. 1C is an oblique bottom view of the assembled cap in accordance with the illustrative embodiment.

FIG. 1C illustrates the cap 100 with the cover 150 secured to the base 110. The cover includes threads (not shown) that engage with the threads 118 on the outer surface of the base. The cap 100 may be stored compactly by securing the cover 150 over the base 110. Further, the filter 130 may be "sandwiched" between the cover and the base for easy storage. The bottom of the base 110 comprises threads 114 that engage with threads (not shown) located on the outer surface of an inlet of a conventional water storage container. Thus, the cap 100 may be secured to the storage container by screwing the base 110 onto the inlet, placing the filter 130 within the base, positioning the cover 150 over the filter and tightening the cover to the base. A "soft ring" 112, such as a rubberized O-ring, may be positioned, e.g., in a groove, along the perimeter of the underside of the base 110, to form a seal with a surface of the inlet or the bottle as discussed below with reference to FIGS. 2A-B.

Figure 2A:
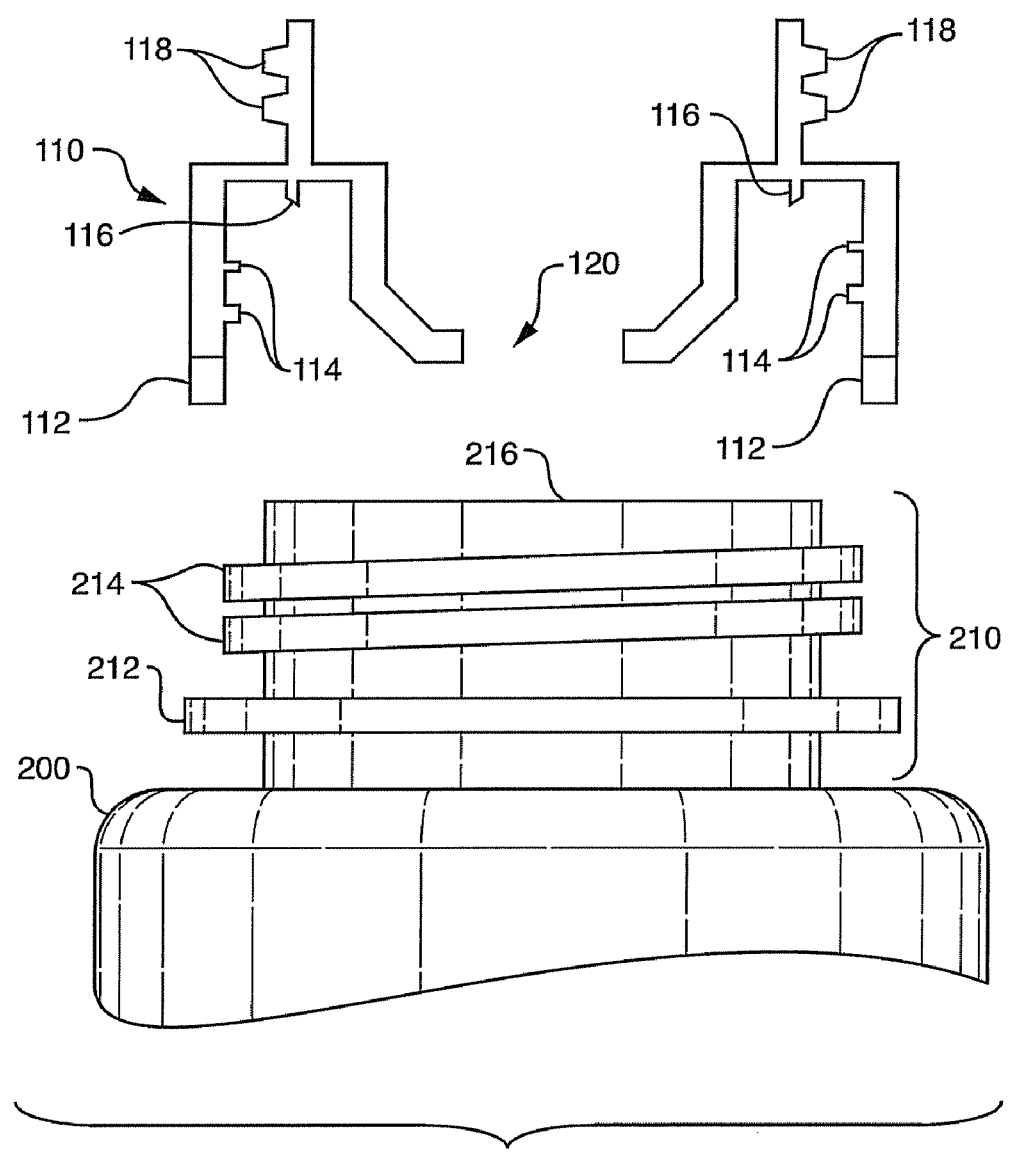
FIG. 2A is a cut away cross-sectional view of the illustrative base and a conventional water storage container.

FIG. 2A illustrates a cross-sectional view of the illustrative base 110 and a conventional water storage container 200 having an inlet 210 through which water can enter and exit the body of the container. The inlet includes a flange 212 that extends around the circumference of the inlet 210. The flange is near the bottom of the inlet, i.e., relatively close to the body of the container 200. The outer surface of the inlet contains one or more threads 214 which engage the threads 114 on the base 110. Accordingly, the base may be threaded onto the inlet, until the soft ring 112 forms a watertight pressure seal against the flange 212. A ring 116, e.g., molded on the base 110, forms a second water-tight pressure seal with the inlet's top surface 216 while the base is attached. In this manner, the watertight seals formed by the rings 112 and 116 isolate the outer surface of the inlet 210, including the threads 214, from the untreated water.

Figure 2B:
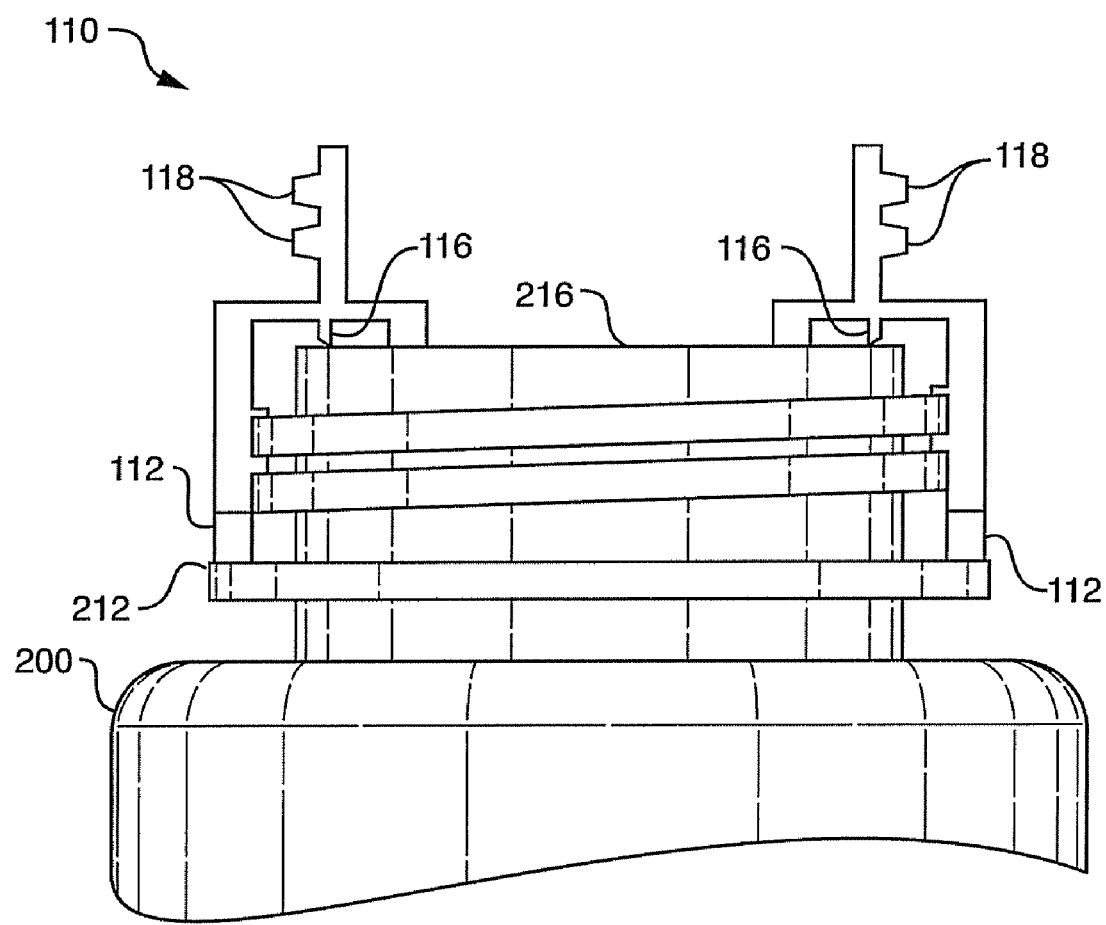
FIG. 2B is a cut away cross-sectional view of the illustrative base engaged with the water storage container of FIG. 2A.

FIG. 2B illustrates the base 110 attached to the inlet 210. The storage container 200 may be filled with water that flows through the hole 120 in the base 110. The filter 130 may be seated within the base so only filtered water enters the body of the container. In this case, the mesh 132 entraps impurities, such as heavy metals and sediment, as water enters the container 200.

Figure 3:
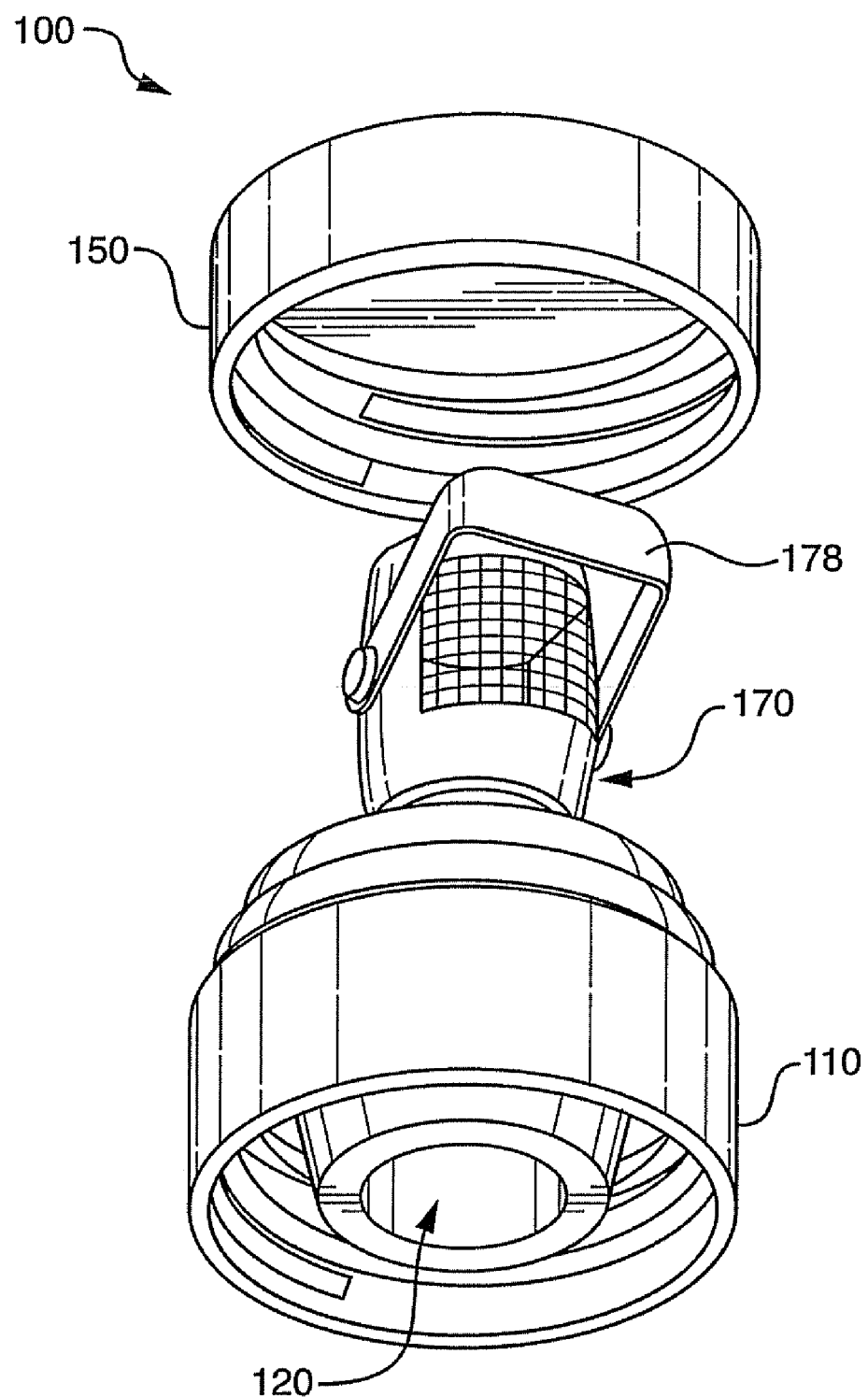
FIG. 3 is an oblique bottom view of a cap assembled in accordance with another illustrative embodiment of the present invention, the cap including the illustrative base and cover shown in FIGS. 1A-C.

FIG. 3 illustrates another embodiment of the cap 100. The cap includes a removable filter 170 adapted to be positioned between the base 110 and the conventional Nalgene™-type cover 150. Illustratively, the filter 170 can be placed within the base in two possible orientations: a first orientation that permits water to flow through the filter and into the hole 120 and a second orientation that essentially "closes" the hole 120, thereby preventing water from passing through the base. As shown, the filter may be switched from one orientation to the other by rotating the filter 180 degrees (see FIGS. 5A-B below). To facilitate the rotation between the different orientations, the filter 170 includes a handle 178 by which the filter can be removed from the base 110.

Figure 4A:
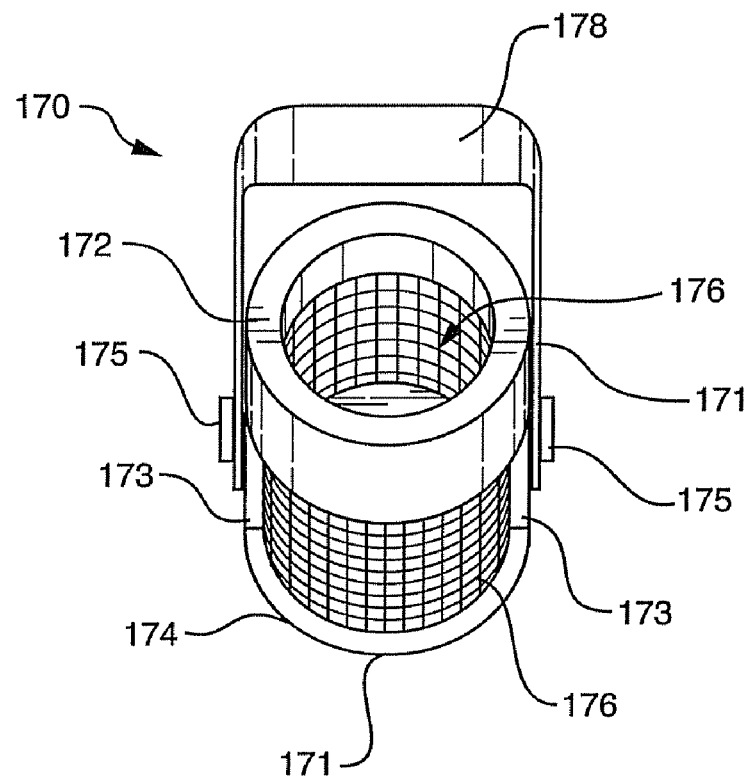
FIGS. 4A-B are oblique top views, rotated 180 degrees relative to one another, of an illustrative filter that may be employed in the cap assembly of FIG. 3.
Figure 4B:
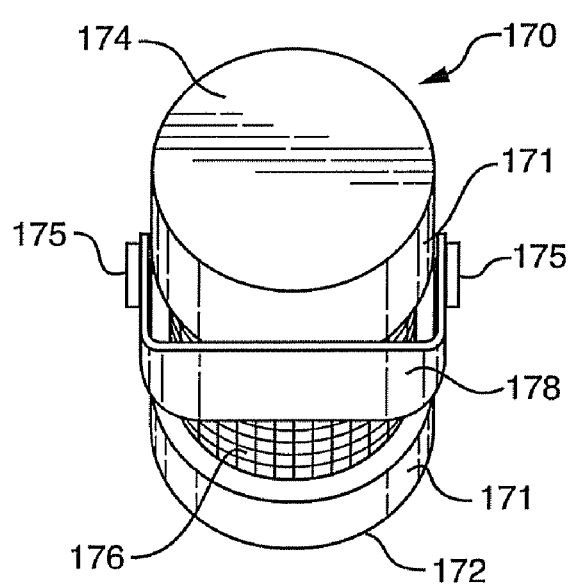

FIGS. 4A-B illustrate the filter 170 in more detail. The filter is substantially cylindrical in shape and includes opposing "open" and "closed" ends 172 and 174. A pair of latitudinal bands 171 is located circumferentially around the filter's open and closed ends. A set of supports 173 extends longitudinally along the outer surface of the filter and connects to the bands 171. The supports 173 and the bands 171 thus define a set of openings in the outer surface of the filter, where a different filter mesh 176 is positioned in each of the openings. Each of the filter meshes may be constructed from various materials, such as plastic or metal strands, and may be molded, embedded or otherwise secured within their respective openings in the filter's outer surface. Further, the meshes' hole sizes are selected so as to block relatively large contaminants, such as heavy metals, dirt, etc., as water flows through the mesh. The handle 178 is rotatably attached to the longitudinal supports 173 by, for example, snapping the handle onto outwardly extending posts 175. The handle is sized to rotate around the filter, as shown in FIGS. 4A-B.

Figure 5A:
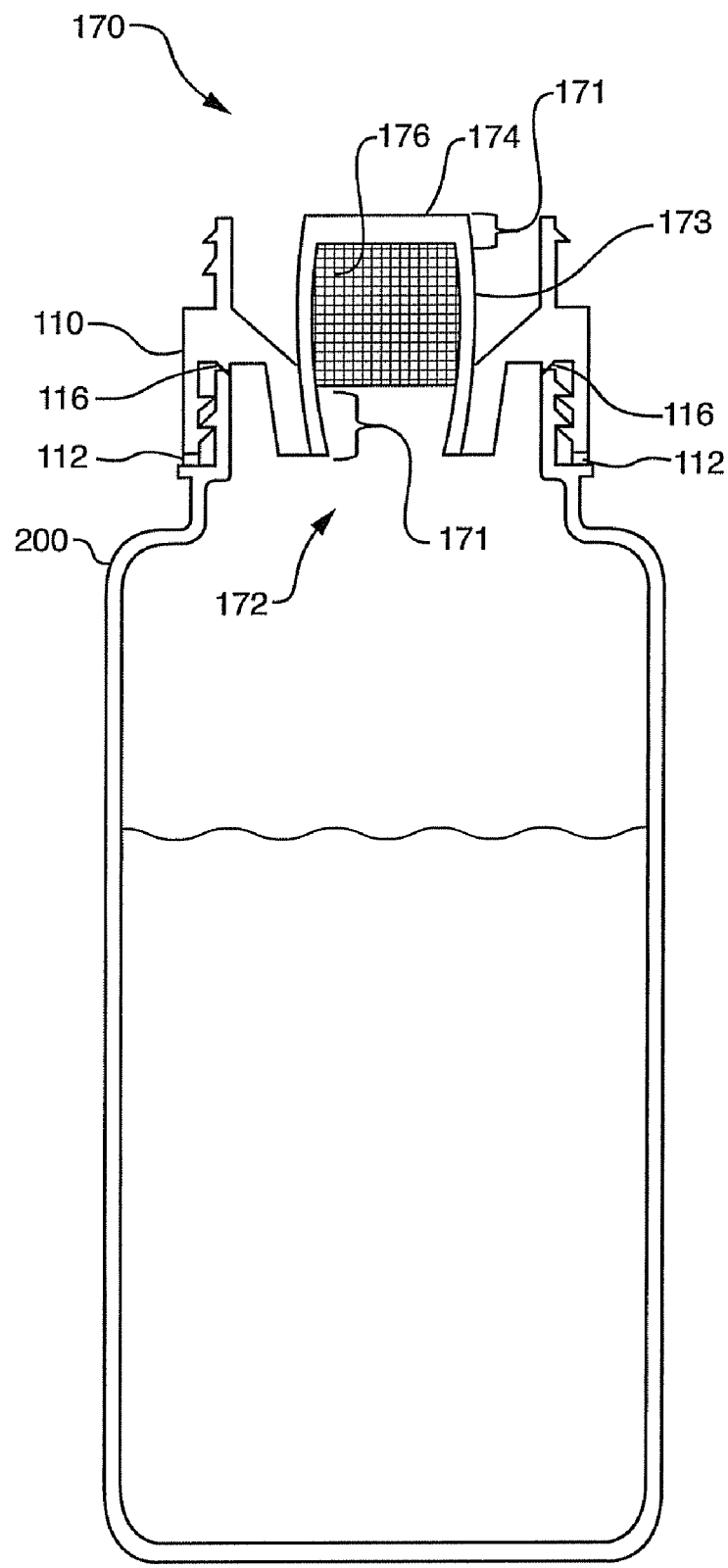
FIG. 5A is a cut away cross-sectional view of the cap assembly engaged with a conventional water storage container in a manner that prevents filtered and/or purified water within the container from becoming re-contaminated.
Figure 5B:
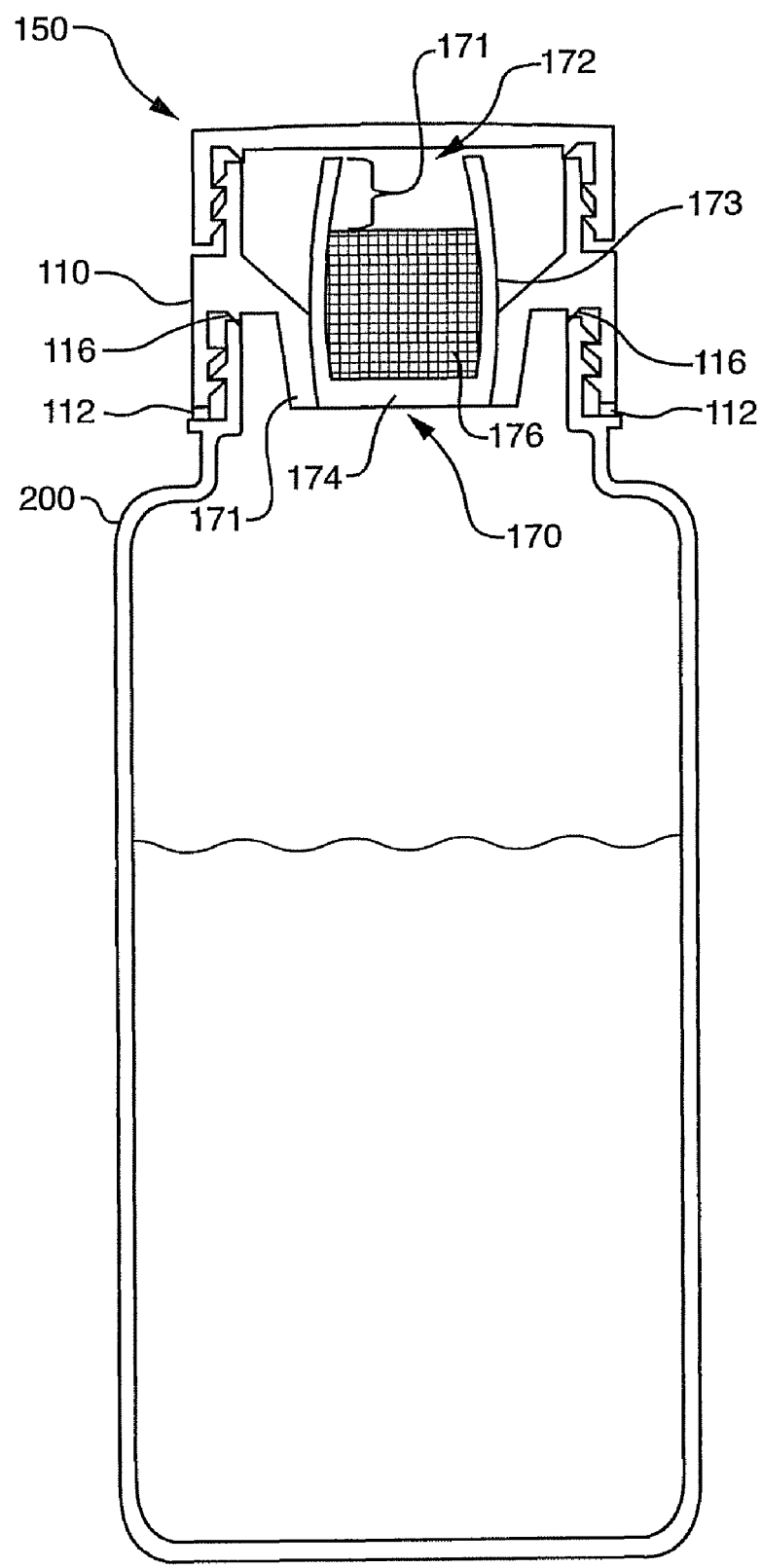
FIG. 5B is a cut away cross-sectional view of the cap assembly engaged with the conventional water storage container in a manner that permits water to filter through the filter and into the body of the container.

FIGS. 5A-B illustrate different orientations by which the cap assembly may be engaged with a conventional water storage container 200. In both orientations, the base 110 is engaged with the storage container, and, as a result, watertight seals are formed above to and below the container's inlet, e.g., by the rings 112 and 116. As shown in FIG. 5A, the filter 170 is oriented in the base with its closed end 174 positioned above its open end 172 so water may flow through the filter meshes 176 and into the container 200. For simplicity, the filter's handle 178 is not shown. The filter 170 is preferably secured in the base 110 by pressure fitting the band 171 around the filter's open end 172 in the hole 120 of the base. In this case, the filter meshes 176 extend immediately above the pressure seal. Rather than being pressure fitted, the filter alternatively may be seated on a rim or ledge on the base. Moreover, the filter 170 may be lock-fitted to the base by a twisting motion that engages threads (not shown) on the band 171 with threads (not shown) on the base 110.

In operation, the vertical orientation of the filter meshes 176 permits the meshes to act simultaneously as a vent and a filter. Thus, as water flows through the bottom portions of the meshes, air can escape through the top portions of the meshes, thereby equalizing the air pressure within the storage container 200 as filtered water enters the container. Moreover, when the filter 170 is completely submerged in water, the pressure differential between the top and bottom portions of the meshes 176 permits higher-pressure water at the bottom portions to flow into the storage container while air within the container escapes through the top portions which are at lower pressure.

The filter 170 may be submerged at an angle so that one of the filter meshes 176 is substantially positioned above the other. In this case, the lower mesh filters water entering the container 200 while the upper mesh serves as a vent. If the lower mesh becomes clogged or otherwise obstructed by the filtered impurities, the container 200 may be rotated 180 degrees so the lower filter mesh becomes the upper mesh, and vice-versa. In this rotated position, the clogged filter mesh serves as the air vent, and the out-rushing air clears the clogs. Therefore, as clogging occurs, the storage container can be rotated as needed to allow the filtered water to flow into the container.

Figure 6A:
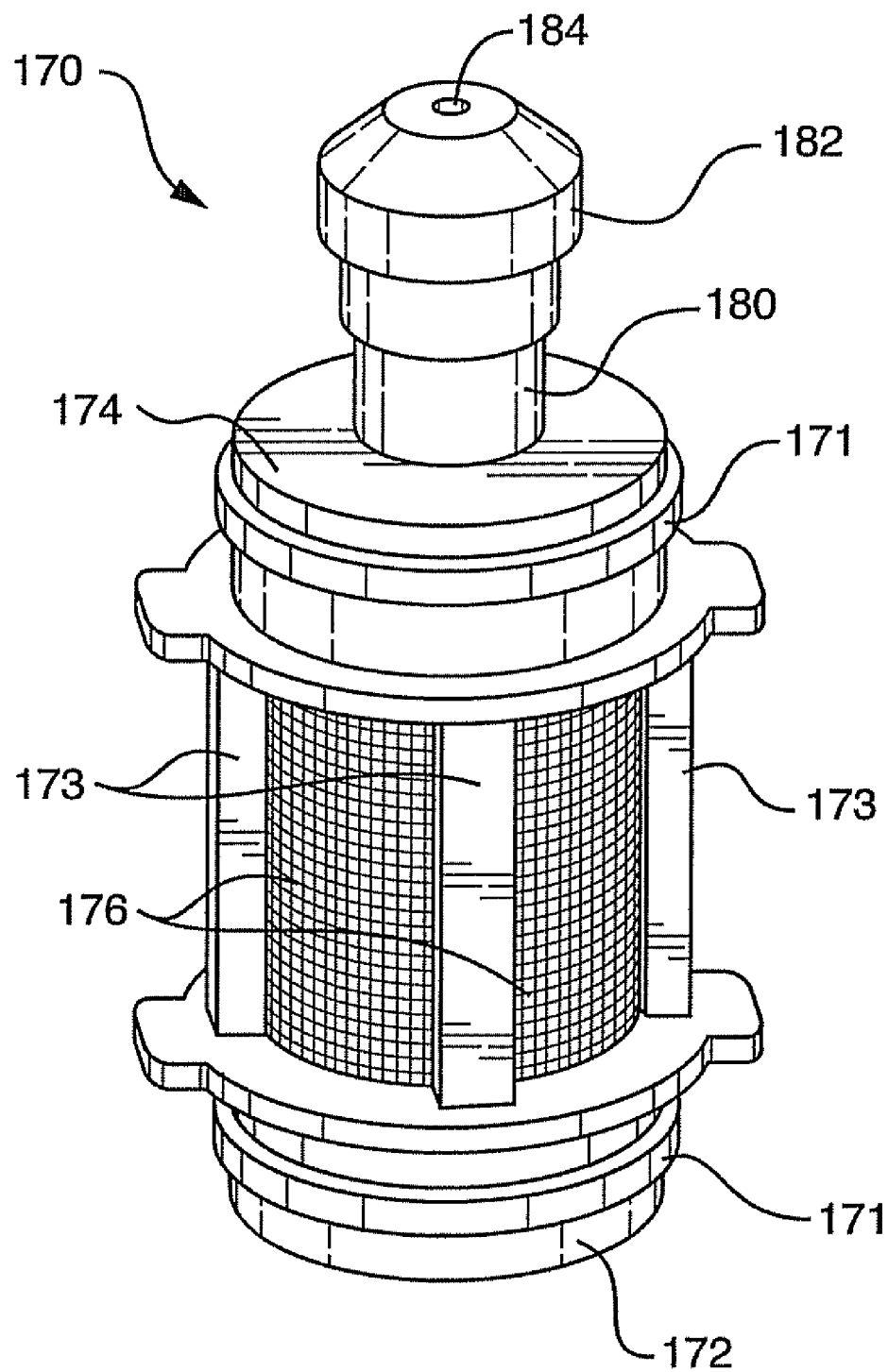
FIGS. 6A-B are oblique side views of an illustrative filter having an air vent that may be adjustably opened and closed.
Figure 6B:
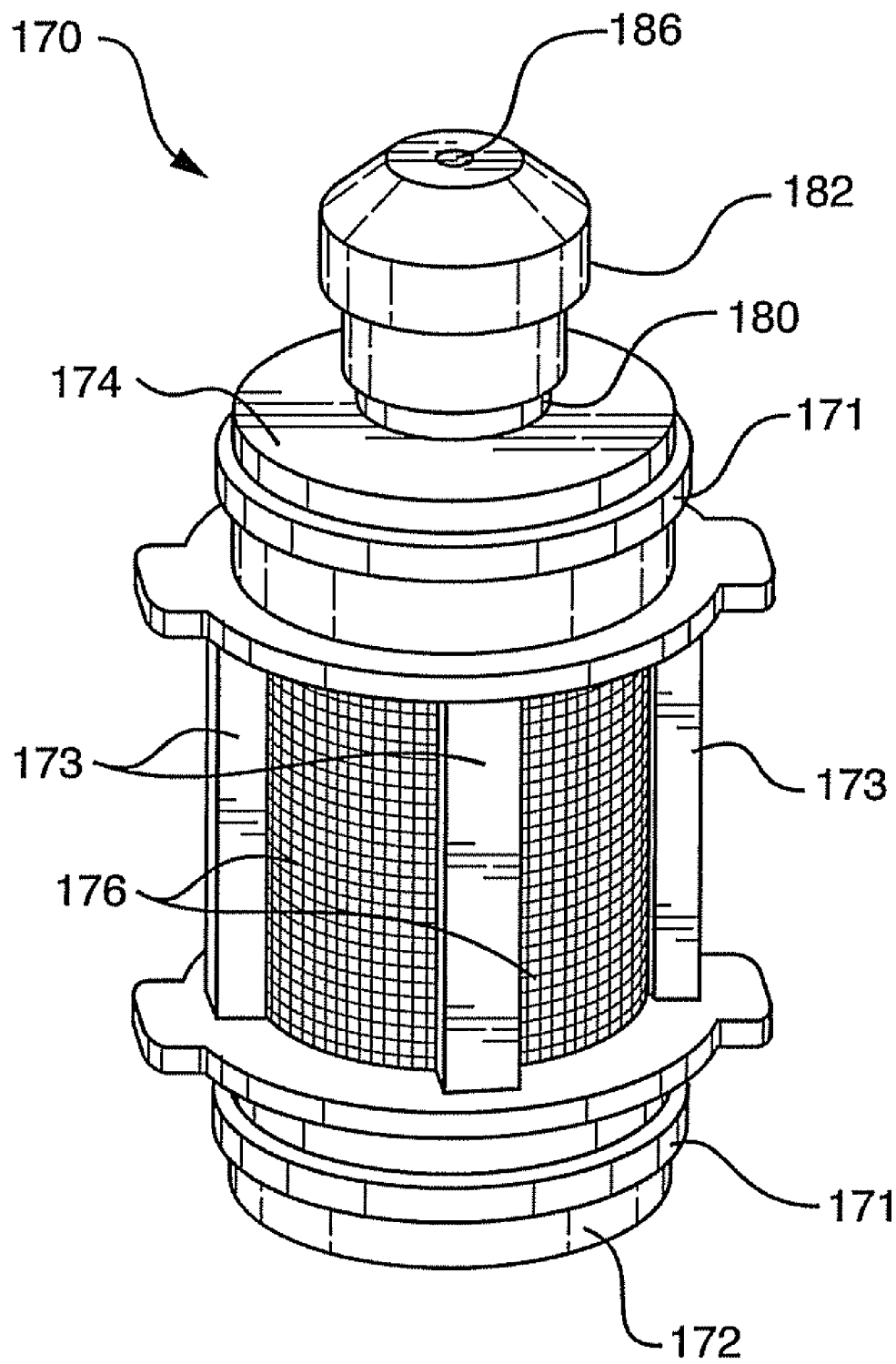

In practice, it is sometimes desirable to select relatively small openings in the filter meshes 176 in order to provide "finer" filtering as water enters the water storage container 200. However, in these cases, the relatively small holes may impede the passage of air from the container 200 when, for example, the container is fully submerged during the to water-filling process. To address this, FIGS. 6A-B illustrate an embodiment of the filter 170 which is further adapted to facilitate air passage through the cap assembly 100.

As shown, the filter 170 includes on its closed end 174 an air vent 180 that can be selectively opened and closed. In the embodiment shown in the drawings, a pull valve 182 is included, to open and close the vent. The valve may be lifted in an upwards direction relative to the closed end 174 in order to open the vent and allow air to escape through a hole 184 at the top of the valve (FIG. 6A). Thereafter, the valve 182 may be displaced in a downward direction to close the vent, with a plug 186 situated within the outlet 180 sealing the hole 184 (FIG. 6B). Accordingly, during the water-filling process; the valve may be positioned in its open position to provide a low-resistance path through which air can escape the water storage container 200, even when the container is fully submerged underwater. Then, once the container has been filled, the valve may be depressed and the vent returned to its closed position.

Figure 7:
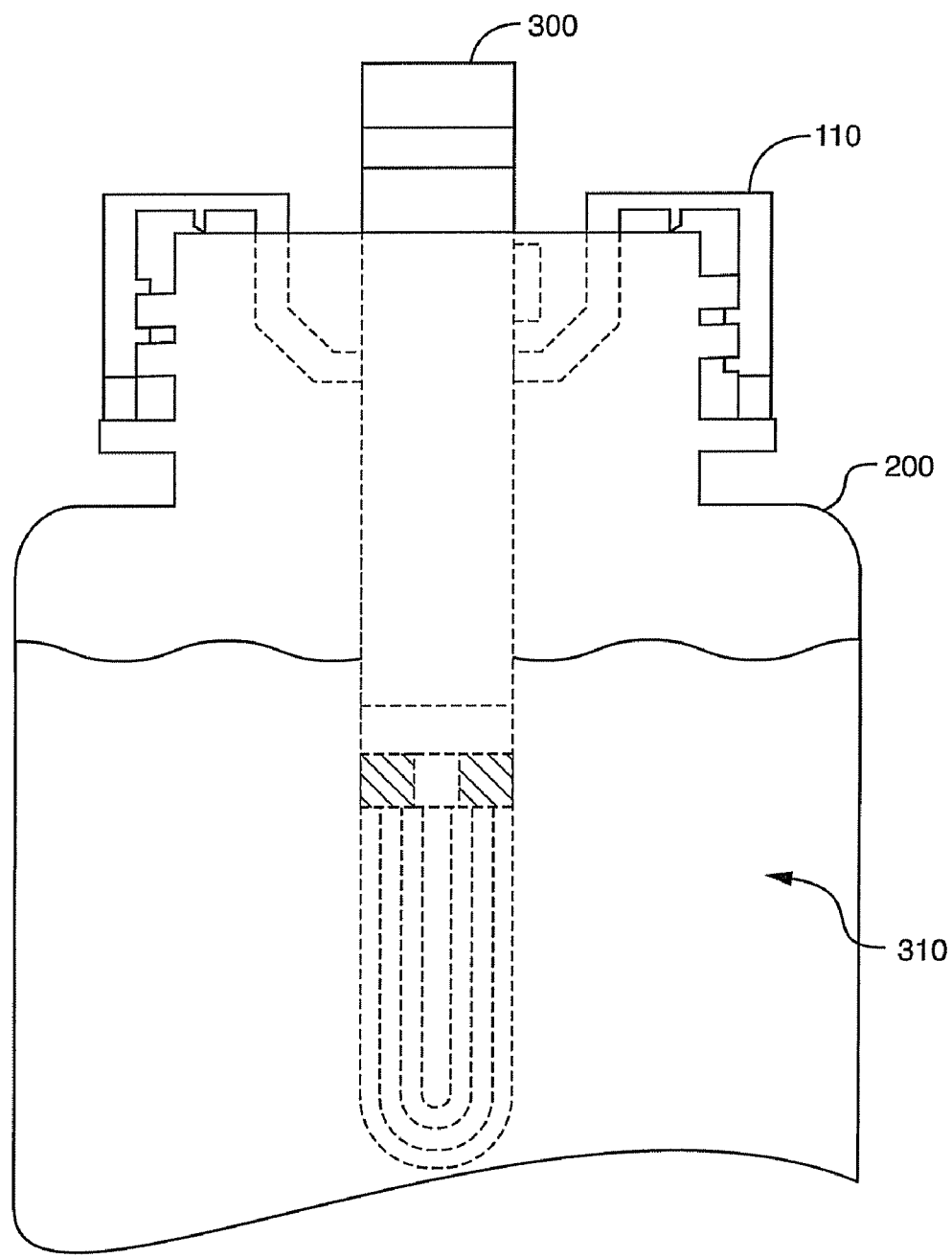
FIG. 7 is a cut away cross-sectional view of an ultra-violet source applied to water stored in the water storage container while the illustrative base is engaged with the container.

After the filtered water has been stored in the storage container 200, the filter 170 is removed and, if desired, the filtered water is disinfected as discussed below with reference to FIG. 7. At this point, the base 110 may be removed and the water accessed, e.g., for drinking or cooking. When the filtered and/or purified water is to be stored in the container 200, the closed end 174 of the filter 170 is wiped clean and the filter is then repositioned in the base 110 as shown in FIG. 5B, such that the filter's closed end 174 is pressure fitted into the base to prevent the filtered and/or purified water within the container from escaping. The filter 170 is preferably secured in the base by pressure fitting the band 171 around the filter's closed end 174 in the hole 120 of the base. Alternatively, the filter may be seated on a rim or ledge on the base or may be threadingly secured to the base. Further, the filter 170 preferably extends to the bottom of the hole 120. The cover 150 engages with the base 110 in a manner that "sandwiches" the filter 170 therebetween.

As discussed, the filter mesh 132 or 176 may not effectively block some biological contaminants, such as bacteria and viruses. Accordingly, the filter 130 or 170 (or if one piece, the base with integrated filter) may be removed so chemical and/or irradiative water treatments can be employed to exterminate any microbes still resident in the filtered water. For instance, the water may be disinfected by chlorine, iodine, etc. supplied through the hole 120. Alternatively, the filtered water may be purified by UV radiation provided by a UV source that is inserted through the hole 120 and into the container 200. A hand-held UV source that may be used in this manner is described in U.S. Pat. No. 5,900,212 to Maiden et al, entitled Hand-Held Ultraviolet Water Purification System, is which is hereby incorporated by reference as though fully set forth herein. FIG. 7 illustrates an exemplary hand-held UV source 300 inserted through the base 110 and into water 310 stored in the container 200. In practice, the storage container 200 may be inverted after the UV source is inserted through the base, to ensure that the water level covers a water-level sensor that controls when the UV source can turn on. Further, the inverting ensures that scattered droplets that might otherwise adhere to the sides of the container are fully incorporated into the water for treatment.

After the water storage container 200 is filled with the filtered water and the water is disinfected, as necessary, the base 110 is removed and a person can then safely drink directly from the inlet 210. Specifically, the watertight seals formed by the rings 112 and 116 ensure that no contaminated water contacts the outer surface of the inlet 210 during the water-filling process, even if the container 200 is submerged or partly submerged in the untrusted water. Thus, in contrast to prior filtration systems, no contaminants can adhere to the outer surface of the inlet and threaten the drinker's health if he/she drinks directly from the storage container after the base 110 is removed.

Figure 8:
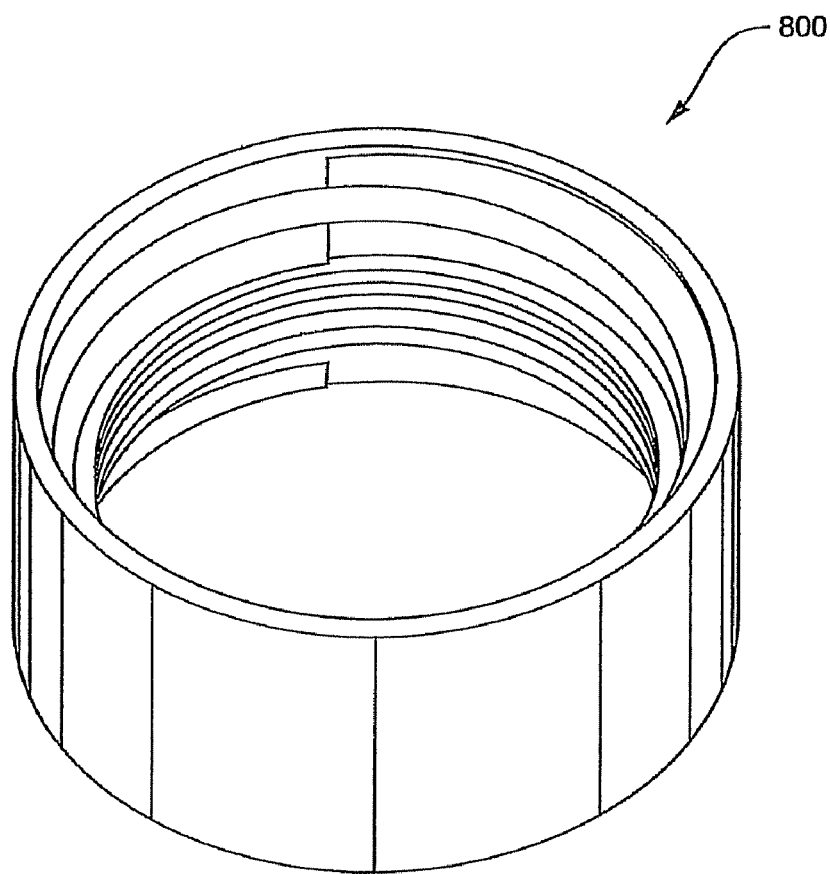
FIG. 8 an oblique top view of a removable connector ring in accordance with an illustrative embodiment.
Figures 9A, 9B:
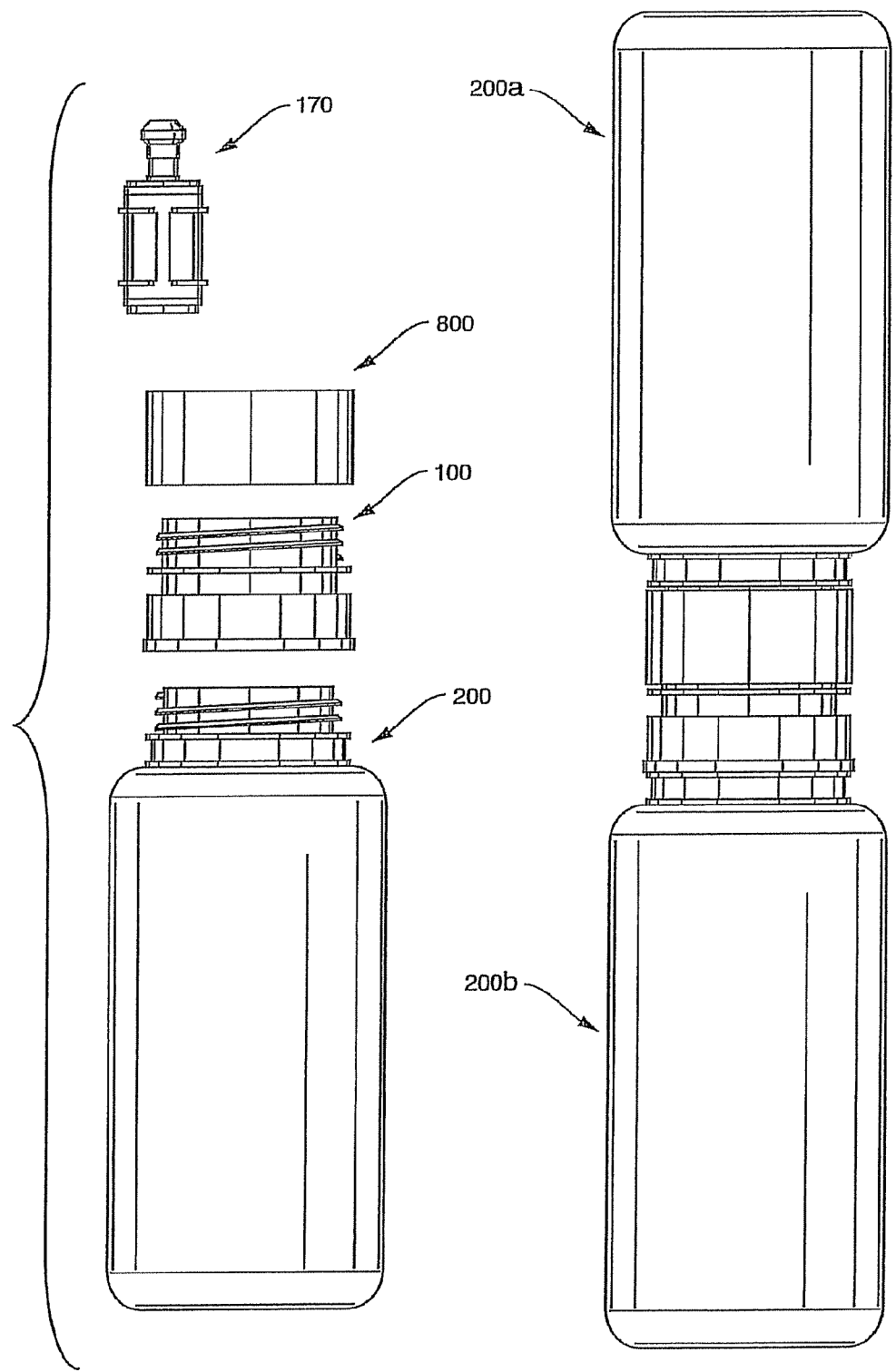
FIG. 9A is an oblique side view of a water bottle, cap, removable connector ring, and filter that collectively may be used to assemble an illustrative embodiment of the present invention.
FIG. 9B is an oblique side view of a removable connector ring assembled in accordance with an illustrative embodiment of the present invention.

FIGS. 8 and 9A,B illustrate the use of a removable connector ring 800 in a two bottle filtration system 900. The removable connector ring 800 threadingly engages the cap 100 and an inlet of a first water bottle 200A to interconnect the two bottles and provide a water-tight path for the water through the filter element 170. A user fills the first water bottle 200A with unfiltered water or other liquid requiring filtration. Then, the user attaches the removable connector ring 800 onto the first water bottle 200A by threadingly engaging the inlet of the bottle. Next, the user attaches the cap 100 to the second water bottle 200B. The filter element 170 may be inserted within the cap before the cap is attached, or may be inserted into the cap thereafter. The filter element is a mesh filter, the to mesh size is within a range between 4 and 2 microns. The user then attaches the removable connector ring 800 to the cap 100, while holding the first water bottle upright and the second container upside down. Finally, the user flips the system, such that the first water bottle 200A is vertically on top of the second water bottle 200B, to allow filtration of small and large particle impurities in the water or other liquid, as it flows from the first water bottle 200A to the second water bottle 200B without the user tending to the water bottles.

The filter element 170 is a one-way filter, which allows the unfiltered water to flow from the first water bottle to the second water bottle, but not from the second container back to the first container. The system allows the user to quickly fill one bottle with unfiltered water, assemble the two bottles, and have filtration occur slowly without tending by the user. The user may, for example, place the assembled system in a backpack to allow filtration to occur as the user proceeds further on a hike.

Once the filtered water has flowed into the second water bottle, a user may remove the filter element 170 and in its place insert a UV source 300. In practice, the water bottle 200B may be inverted after the UV source 300 is inserted through the cap, to ensure that the water level covers a water-level sensor, which is a safety feature that controls when the UV source 300 turns on. Further, the inverting ensures that scattered droplets that might otherwise adhere to the sides of the container are fully incorporated into the water for treatment.

Alternatively, the user can attach the removable connector ring 800, cap 100, and second water bottle 200B together initially. Then the user can fill the first water bottle with unfiltered water, and while holding the first water bottle upright, the user can attach removable connector ring 800 to the first water bottle 200A. Next, the user flips the system, such that the first water bottle 200A is vertically on top of the second water bottle 200B, to allow filtration of small and large particles from the water or liquid as it flows from the first water bottle 200A to the second water bottle 200B, without the user tending to the water bottles.

Additionally, a user can perform the UV purification before filtering out the particles from the water. In this method, a user fills the first water bottle 200A with water, such as from a lake, then the user places the cap 100 onto the first water bottle 200A. The user then inserts a UV source 300 within the cap 100. The user inverts the first water bottle 200A, to ensure that the water level covers a water-level sensor that controls when the UV source 300 turns on. After the UV treatment of the contents of the first water bottle 200A, the user removes the UV source 300 and inserts filter element 170. Then, the user attaches the connector 800 to the first water bottle 200A and the second water bottle 200B. Lastly, the user flips the system, such that the first water bottle 200A is vertically on top of the second water bottle 200B, to allow filtration of small and large particles from the water or liquid as it flows from the first water bottle 200A to the second water bottle 200B without user tending to the water bottles.

The foregoing has been a detailed description of an illustrative embodiment of the invention. Various modifications and additions can be made without departing from the spirit and scope of the invention. For example, the portable water filtration system may be used to filter other liquids besides (or in addition to) water. In addition, structural elements of the cap 100 may be replaced with their functional equivalents. For instance, although the ring 116 is depicted as a tapered ring molded into the base 110, it alternatively may be embodied as other functionally equivalent structures, such as a rubberized O-ring seated in a groove. Also, the mesh 132 may be implemented having various hole sizes and may be replaced by various porous filter media known in the art. Further, the hole 120 may be a variety of different shapes and sizes positioned approximately at the center of the base 110. The filter 170 may be constructed with or without the handle 178. The ring 112 may seat on the top surface of the body of the container if the flange 212 is not incorporated with the container. Alternatively, the base may extend over the flange 212 and seal to the surface of the body of the container. Further, the cap may be snap fit onto a container that does not have a threaded inlet. Additionally, the filter may be lock-fitted to the base, e.g., by threadingly securing the filter to the base. Also, the mechanism that selectively opens and closes the air vent 180 may be implemented in other ways besides using the pull valve 182. For instance, an adjustable flap or removable plug alternatively may be used to open and close the vent. Additionally, the water bottle may be a storage container for holding liquids. Furthermore, the water bottle is depicted with a wide mouth opening, however the water bottle also can have a small mouth opening. Also, the filter element 170 may be a charcoal filter, a ceramic filter, a mesh filter, or other similar type filters. Accordingly, this description is meant to be taken only by way of example and not to otherwise limit the scope of the invention.

What is claimed is:

1. A system, comprising:
 a first water bottle containing a liquid;
 a second water bottle;
 a portable filter cap that attaches to an inlet of the second water bottle, and is configured with a filter element to filter fluid into the second water bottle; and
 a removable connector ring that is configured to threadingly engage to both an inlet of the first water bottle and the portable filter cap to provide a water-tight passage between the first water bottle and the second water bottle, to allow the liquid to flow from the first water bottle through the filter element to the second water bottle.

2. The system according to claim 1, wherein the portable filter cap and the filter element are integrated into a single component.

3. The system according to claim 1, wherein the filter element is a charcoal filter or a ceramic filter.

4. The system according to claim 1, wherein the filter element is a mesh filter with a mesh size between approximately 4 and 2 microns.

5. The system according to claim 1, wherein the filter element is a one way filter.

6. The system according to claim 1, wherein the portable filter cap isolates an outer surface of the inlet of the second water bottle from fluid contact by forming separate watertight pressure seals above and below the outer surface of the inlet.

7. The system according to claim 6, wherein one of the watertight pressure seals is formed against a flange located near a base of the inlet and the other watertight pressure seal is formed against a top surface of the inlet.

8. The system according to claim 7, wherein a rubberized O-ring forms the watertight pressure seal against the flange.

9. The system according to claim 7, wherein a molded ring in the base element of the portable filter cap forms the watertight pressure seal against the top surface of the inlet.

10. The system according to claim 1, further comprising
a hand-held UV source that is configured to replace the filter element in the portable filter cap when the filter cap is attached to the inlet of the second water bottle and at least the first water bottle is removed, and
the portable filter cap holds the hand-held UV source in position to provide UV radiation to purify the filtered liquid held in the second water bottle.

11. The system according to claim 1, wherein the portable filter cap comprises an air vent having an open position and a closed position, the open position allowing air to escape through the air vent as the liquid flows into the second water bottle.

12. The system according to claim 1 wherein the portable filter cap remains in place on the second water bottle when the first water bottle and the connector ring are removed, to prevent the liquid from contacting the outer surface of the inlet of the second water bottle.

13. The system according to claim 11 wherein, after removal of at least the first water bottle, the air vent is configured in the closed position to prevent the filtered liquid from escaping the second water bottle.

* * * * *

UNITED STATES PATENT AND TRADEMARK OFFICE
CERTIFICATE OF CORRECTION

PATENT NO.       : 8,197,771 B2
APPLICATION NO.  : 12/748941
DATED            : June 12, 2012
INVENTOR(S)      : Miles Maiden Page 1 of 1

It is certified that error appears in the above-identified patent and that said Letters Patent is hereby corrected as shown below:

Column 1, line 14, delete "to";
Column 1, line 31, delete "wan ter" and insert --water--;
Column 2, line 23, delete "to";
Column 4, line 7, delete "to";
Column 5, line 26, delete "to";
Column 6, line 2, delete "to";
Column 6, line 53, delete "is";
Column 7, line 21, delete "to";

Signed and Sealed this
Thirty-first Day of July, 2012

David J. Kappos
*Director of the United States Patent and Trademark Office*